United States Patent
Twigg

(10) Patent No.: US 7,488,456 B2
(45) Date of Patent: Feb. 10, 2009

(54) METHOD OF TREATING ATMOSPHERIC POLLUTANTS

(75) Inventor: Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 541 days.

(21) Appl. No.: 10/478,037

(22) PCT Filed: May 15, 2002

(86) PCT No.: PCT/GB02/02139

§ 371 (c)(1), (2), (4) Date: May 12, 2004

(87) PCT Pub. No.: WO02/092197

PCT Pub. Date: Nov. 21, 2002

(65) Prior Publication Data

US 2004/0197253 A1 Oct. 7, 2004

(30) Foreign Application Priority Data

May 15, 2001 (GB) ................................. 0111801.7

(51) Int. Cl.
*B01D 50/00* (2006.01)
(52) U.S. Cl. ........................................ 422/177; 422/180
(58) Field of Classification Search .................. 422/177, 422/180; 502/527.12, 302, 329
See application file for complete search history.

(56) References Cited

U.S. PATENT DOCUMENTS

| | | | |
|---|---|---|---|
| 5,034,367 A | 7/1991 | Falke et al. | |
| 5,580,534 A | 12/1996 | Hartweg et al. | |
| 5,945,080 A | 8/1999 | Hartweg et al. | |
| 6,027,703 A | 2/2000 | Hartweg et al. | |
| 6,046,129 A | * 4/2000 | Duan et al. | .................. 502/302 |
| 6,605,559 B1 | 8/2003 | Yamada et al. | |

FOREIGN PATENT DOCUMENTS

| | | |
|---|---|---|
| DE | 100 48 160 A1 | 5/2001 |
| EP | 1 000 658 A2 | 5/2000 |
| GB | 1 522 389 | 8/1978 |
| WO | WO-90/11433 | 10/1990 |
| WO | WO-96/22146 | 7/1996 |
| WO | WO-96/22148 | 7/1996 |
| WO | WO-96/22149 | 7/1996 |
| WO | WO-97/11769 | 4/1997 |

OTHER PUBLICATIONS

International Search Report dated Sep. 30, 2002, from International Application No. PCT/GB02/02139.
British Search Report dated Oct. 29, 2001, from British Application No. 0111801.7.

* cited by examiner

*Primary Examiner*—Tom Duong
(74) *Attorney, Agent, or Firm*—RatnerPrestia

(57) ABSTRACT

A method of reducing at least one atmospheric oxidizing pollutant, such as ozone, with a reducing agent comprises contacting the reducing agent with the at least one atmospheric oxidizing pollutant, wherein the reducing agent comprises a precious metalfree trap material, such as a zeolite, including at least one trapped atmospheric reducing pollutant, e.g. a hydrocarbon, whereby as the at least one atmospheric oxidizing pollutant is reduced the at least one trapped atmospheric reducing pollutant is oxidized.

24 Claims, 2 Drawing Sheets

METHOD OF TREATING ATMOSPHERIC POLLUTANTS

Figure 1A:
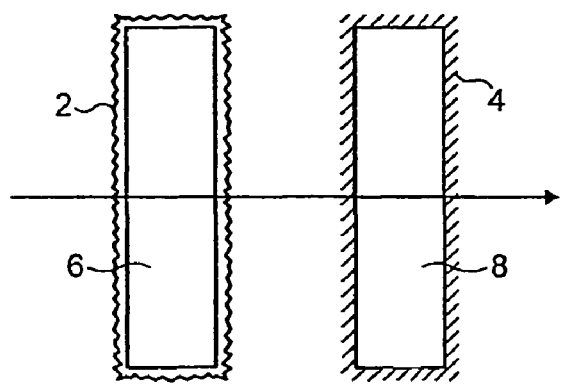

This application is the U.S. National Phase application of PCT International Application No. PCT/GB02/02139.

The present invention relates to a method of reducing at least one atmospheric oxidising pollutant, such as ozone ($O_3$) or nitrogen dioxide ($NO_2$), with a reducing agent and to an apparatus for treating at least one atmospheric oxidising pollutant and at least one atmospheric reducing pollutant, e.g. a hydrocarbon.

Ground-level $O_3$, a component of smog, is created from the reaction of nitrogen oxides (NOx) and hydrocarbons (HC), from vehicle and industrial emissions. Aldehydes, organic species having a relatively high Maximum Incremental Reactivity adjustment factor (MIR) also known as carter factors (as defined by "Californian Non-methane organic gases test procedures", The California Environmental Protection Agency Air Resource Board dated Aug. 5, 1999), are also produced. Part of this reaction is catalysed by sunlight and can be represented by two equations:

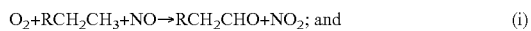

$$O_2 + RCH_2CH_3 + NO \rightarrow RCH_2CHO + NO_2; \text{ and} \quad (i)$$

$$NO_2 + O_2 \xrightarrow{h\nu} O_3 + NO. \quad (ii)$$

Smog can cause asthma and respiratory ailments and is a particular problem in the southern California basin, Los Angeles and Houston, Tex. in the USA.

In WO 96/22146, Engelhard describes the concept of coating an atmosphere-contacting surface of a vehicle with a composition for treating one or more atmospheric pollutant, such as $O_3$ alone, $O_3$ and carbon monoxide (CO) or $O_3$, CO and HC. The surface is preferably that of a heat exchanger, such as a radiator or air conditioner condenser, located within the vehicle's engine compartment. As the vehicle is propelled through the atmosphere, pollutants suspended in the atmosphere contact the composition and, depending on the formulation of the composition, it catalyses the reduction of the atmospheric oxidising pollutant $O_3$ to oxygen wand/or the oxidation of the atmospheric reducing pollutant carbon monoxide to carbon dioxide and/or of HC to water and carbon dioxide.

By "atmospheric oxidising pollutant" herein, we mean an atmospheric pollutant that has the potential to oxidise other atmospheric pollutants in a redox reaction. Examples of atmospheric oxidising pollutants are $O_3$, $NO_2$, nitrogen tetroxide ($N_2O_4$) and sulfur trioxide ($SO_3$).

By "atmospheric reducing pollutant" herein, we mean an atmospheric pollutant that has the potential to reduce other atmospheric pollutants in a redox reaction. Non-limiting examples of atmospheric reducing pollutants are hydrocarbons including aliphatic hydrocarbons, e.g. alkanes, and cyclic hydrocarbons; paraffins; olefins, alkenes and alkynes; dialkenes including conjugated unsaturated hydrocarbons; carboxylic, peroxy or sulfonic acids; partially oxygenated hydrocarbons including aldehydes, conjugated aldehydes, ketones, ethers, alcohols and esters; amides; ammonium compounds; aromatic hydrocarbons and cycloparaffins; any of the above including one or more nitrogen-, sulfur-, oxygen- or phosphorus-atoms; CO; sulphur dioxide and soot or particulate matter components exhausted from, e.g. a power plant (as defined hereinbelow).

Engelhard markets a vehicle radiator having a catalytic coating for reducing $O_3$ under the trade name PremAir®. Details of PremAir® can also be found on Engelward's website at www.Engelhard.com/premair. It is also described in its WO 96/22146. We understand that the active material on the marketed radiators is a manganese-based component, cryptomelane ($KMn_8O_{16} \cdot xH_2O$, structurally related to $\alpha$-$MnO_2$). Coated radiators have been fitted on certain Volvo production passenger vehicles, e.g. the S80 luxury sedan in USA and throughout Europe.

At page 12, lines 16-24 of WO 96/22146, it is stated: "adsorption compositions can also be used to adsorb pollutants such as hydrocarbons and/or particulate matter for later oxidation or subsequent removal. Useful and preferred adsorption compositions include zeolites, other molecular sieves, carbon . . . . Hydrocarbons and particulate matter can be adsorbed from 0° C. to 110° C. and subsequently treated by desorption followed by catalytic reaction or incineration." Further details of "adsorption compositions" are given at page 48, lines 13-37. There is no Example in WO 96/22146 showing the ability of precious metal-free adsorption compositions to treat a synthetic gas mixture including both $O_3$ and hydrocarbons without involving the destruction of the adsorption component itself.

We have now found that a precious-metal free trap material including at least one trapped atmospheric reducing pollutant can reduce at least one atmospheric oxidising pollutant Consequently, the at least one trapped atmospheric reducing pollutant itself is oxidised.

According to one aspect of the present invention, there is provided a method of reducing at least one atmospheric oxidising pollutant with a reducing agent, which method comprises contacting the reducing agent with the at least one atmospheric oxidising pollutant, wherein the reducing agent comprises a precious metal-free trap material including at least one trapped atmospheric reducing pollutant, whereby as the at least one atmospheric oxidising pollutant is reduced the at least one trapped atmospheric reducing pollutant is oxidised.

The Penguin Dictionary of Chemistry, second edition (1990), Ed. D. W. A. Sharp defines a "catalyst" as "A substance which when added to a reaction mixture changes the rate of attainment of equilibrium in the system formally without itself undergoing a permanent change." It will be appreciated that the combination of a trap material and at least one trapped atmospheric reducing pollutant is not a "catalyst" as such since in reducing at least one atmospheric oxidising pollutant, the at least one trapped atmospheric reducing pollutant itself is oxidised. This mechanism also differs from that described by Engelhard above in that the combination of the at least one trapped atmospheric reducing pollutant and the trap material causes both the reduction of the at least one atmospheric oxidising pollutant and the oxidation of the at least one trapped atmospheric reducing pollutant, whereas, according to Engelhard, the HC is first desorbed before it is oxidised.

By "precious-metal free" we mean the absence of a catalytically active amount of a precious metal such as gold, silver or any platinum group metal, e.g. platinum, palladium or rhodium.

By "trapped", we mean adsorbed or absorbed including the physical interaction of a trapped species with a trap material such as by covalent bonding and ionic bonding and electrostatic bonding, such as by van der Waals' forces or hydrogen bonding.

Due to the nature of the trap material, e.g. the presence of "acidic" sites in certain zeolites, reactions of and between trapped species can be promoted in situ usually resulting in the formation of less volatile species, non-limiting examples of reactions which include aldol condensation, oligomerisation and partial fragmentation, e.g. of saturated HC, polymerisation and coking. The term "trapped atmospheric reducing species" etc. is intended to embrace trapped species and products of the in situ reaction of trapped species.

One application for our observation is in treating atmospheric $O_3$ and HC contacted by a vehicle, although non-mobile applications are equally viable, as will be explained below.

Carbon is described in WO 96/22146 both as an alternative pollutant treating catalyst composition (see page 44, first paragraph, and patch #8 and #12 in Example 3 on pages 51-55) and an adsorption component (see page 48, lines 25-30). Whilst it is possible that the carbon-may adsorb HC, we believe that any $O_3$ contacting the HC adsorbed on the carbon will result in the destruction of the carbon catalyst/adsorber itself according to the equation $C+HC+O_3 \rightarrow CO_2 + H_2O$. This is in contrast to the method of the present invention in which the trap material, e.g. zeolite, is substantially inert.

An important feature of the present invention is that the atmospheric reducing pollutant is trapped to react with the atmospheric oxidising pollutant and not merely trapped to release for reaction elsewhere, e.g. gas phase oxidation. It is also a preferred feature of the method that the trap material is such that the residence time of the atmospheric reducing pollutant on the trap material is increased. This enables the nature of the trap material to be "tuned" to trap particular atmospheric reducing pollutants.

For the purposes of the present invention, "atmosphere" as defined herein is the mass of air surrounding the earth, and "atmospheric pollutant" etc. should be interpreted accordingly. For the avoidance of doubt, the atmosphere is not comprised of any atmospheric oxidising pollutant present in a gas exhausted from an engine unless and until the gas exits to atmosphere an exhaust system carrying it.

An advantage of the present invention is that one atmospheric pollutant is used to destroy another with the result that both atmospheric pollutants are converted to less polluting species.

Moreover, the invention provides the advantage that the atmospheric reducing pollutants that-are more reactive, i.e. ones that are more likely to react according to equation (i) above, are selectively treated. More reactive atmospheric reducing pollutants have relatively high MIR adjustment factors in the Table at Appendix 1 of "Californian Non-methane organic gases test procedures", The California Environmental Protection Agency Air Resource Board dated Aug. 5, 1999, incorporated herein by reference. Thus the more reactive species such as 1,3 butadiene, 1,2 propadiene, ethene and alkyl-substituted benzenes and formaldehyde have relatively high MIR adjustment factors. Generally, the more reactive the atmospheric reducing pollutant, the more likely it is to be trapped on the trap material and oxidised to $CO_2$, $H_2O$ and/or an atmospheric reducing pollutant having a lower MIR adjustment factor by combustion with the $O_3$.

In a preferred embodiment, the method of the invention provides a further step of contacting the gas leaving the trap material with at least one agent for reducing at least one atmospheric oxidising pollutant. This additional step ensures that when there is insufficient trapped atmospheric reducing pollutant to reduce the at least one atmospheric oxidising pollutant, the efficiency of the method according to this embodiment to reduce the at least one atmospheric oxidising pollutant, e.g. $O_3$, is maintained.

According to a further aspect, the invention provides an apparatus for treating at least one atmospheric oxidising pollutant and at least one atmospheric reducing pollutant, which apparatus comprises an atmosphere contacting surface, a precious metal-free trap material supported on the surface, which trap material is capable of trapping at least one atmospheric reducing pollutant, and means for causing movement of the surface relative to the atmosphere for contacting the supported trap material with at least one atmospheric oxidising pollutant and at least one atmospheric reducing pollutant, whereby the at least one atmospheric oxidising pollutant is reduced by a combination of the trap material and the at least one trapped atmospheric reducing pollutant, which at least one trapped atmospheric reducing pollutant is consequently oxidised.

For the avoidance of doubt, the surface can be a stationary part in a moving air stream or a moving part in a still atmosphere, provided that in either case a movement causing means causes the movement of air relative to the surface.

An advantage of this aspect of the present invention is that no expensive precious metal catalytic material is required in addition to the trap material and trapped atmospheric reducing component to treat the at least one atmospheric oxidising component. Thus, the present invention renders possible the treatment of, for example, $O_3$ and HC without using expensive catalyst materials such as platinum group metals, e.g. platinum.

The trap material can be any material that traps at least one atmospheric reducing pollutant Examples of trap materials include high surface area inorganic species such as zeolites, other molecular sieves, crystalline silicates, crystalline silicate-containing species, aluminas, silicas, (optionally amorphous) aluminosilicates, layered clays and aluminium phosphates. Where the trap material is zeolite, we prefer beta-zeolite or zeolite Y and most preferably ZSM-5, optionally metal-substituted, so long as the metal substituted zeolite does not decompose $O_3$ per se, e.g. the zeolite is not transition metal substituted.

The percent conversion of atmospheric oxidising and reducing pollutants depends on the temperature and space velocity of the atmospheric air relative to the atmosphere-contacting surface and the temperature of the atmosphere contacting surface. An advantage of the present invention is that relatively large volumes of atmospheric air can be treated at relatively low temperatures. An indication of the amount of air being treated as it passes the trap material is commonly referred to as the space velocity. This is measured as the volume of air per hour which passes across the volume of the trap material and is measured in e.g. liters per hour of air divided by the liters of trap material. That is, the units are reciprocal hours. Space velocities encountered by a radiator mounted in an engine compartment at typical driving speeds of up to 100 mph can range from 0 to 1,000,000 $hr^{-1}$, e.g. 300,000 to 650,000 $hr^{-1}$ or 400,000 to 500,000 $hr^{-1}$.

In a preferred embodiment, the means for causing movement of the surface relative to the atmosphere is a power plant The power plant can be a motor fuelled by gasoline or diesel or alternative fuels such as liquid petroleum gas, natural gas, methanol, ethanol or methane or mixtures of any two or more thereof. Alternatively, the power plant can be an electric cell, a solar cell or a hydrocarbon or hydrogen-powered fuel cell.

Preferably the support surface is on or in a vehicle, and the movement-causing means is a power plant as described above. The vehicle can be a car, van, truck, bus, lorry, aeroplane, boat, ship, airship or train, for example. A particularly preferred application is for use in heavy-duty diesel vehicles, i.e. vans, trucks, buses or lorries, as defined by the relevant European legislation.

The atmosphere-contacting surface can be any suitable surface that encounters and contacts the atmosphere, most preferably, at relatively large flow rates as the vehicle moves through the atmosphere. The support surface is preferably located at or towards the leading end of the vehicle so that air will contact the surface as the vehicle is propelled through it. Suitable support locations are fan blades, wind deflectors, wing mirror backs or radiator grills and the like. Alternative locations for supporting the trap material are given in WO 96/22146 and are incorporated herein by reference.

In a most preferred embodiment the apparatus comprises a heat exchange device such as a radiator, an air conditioner condenser, an air charge cooler (intercooler or aftercooler), an engine oil cooler, a transmission oil cooler or a power steering oil cooler. This feature has the advantage that the heat exchange device reaches above ambient temperatures, such as up to 140° C., e.g. 40° C. to 110° C., at which, for example, $O_3$ reduction can occur more favourably. A further advantage of using heat exchangers as the support surface for the trap material is that in order to transfer heat efficiently they have a relatively large surface area comprising fins or plates extending from the outer surface of a housing or conduit for carrying a fluid to be cooled. A higher surface area support surface provides for a greater level of contact between the trap material and the atmosphere.

By "ambient" herein we mean the temperature and conditions, e.g. humidity, of the atmosphere.

In a particularly preferred embodiment, the apparatus comprises a radiator and/or air conditioning condenser which is housed within a compartment of a vehicle also including the power plant, e.g. an air-cooled engine. This provides the advantage that the radiator and/or condenser is exposed to ambient atmospheric air as the vehicle is propelled through the atmosphere whilst being protected by the radiator grill from damage by particulates, e.g. grit or stones, and from the impact of flies. For mid- and rear-engine vehicles, air intakes and conduits can be arranged to carry atmospheric air to and from the supported trap material. A further advantage of locating the radiator and/or condenser in the engine compartment is that exposure to corrosion-causing agents such as moist air, salt and/or grit is reduced and hence so too is the rate of any corrosion. Whilst the radiator and/or condenser can be formed of any material, it is usually a metal or an alloy. Most preferably, the heat exchanger is aluminium or an alloy containing aluminium. Hereinafter "aluminium" will be used to refer to aluminium and alloys of aluminium.

Another advantage of using a heat exchanger, such as a radiator, as the support surface for the trap material is that the radiator is releasably attached to a vehicle, typically in the engine compartment of the vehicle. This enables coated radiators and other heat exchangers to be retrofitted to the vehicle, e.g. during normal servicing of the vehicle, thereby to improve the pollutant treating ability of the vehicle.

Alternatively the apparatus can be non-mobile, and the surface is associated with the movement-causing means to provide the required relative movement between the surface and the atmosphere. For example, the surface can be one or more blades for causing movement of air. In one embodiment the blades are fan blades for cooling a stationary power plant such as for powering an air conditioning unit or advertising hoarding. In another embodiment the blade is a fan or turbine blade for drawing air into the air conditioning system of a building.

In addition to or instead of the support surface being on a fan or turbine blade, the surface can be the internal surfaces of pipes, tubes or other conduits for carrying atmospheric air, e.g. in an air conditioning system for a vehicle or a building and condenser elements in air conditioning units as long as the movement of the air is caused by a movement causing means.

In another preferred embodiment, the apparatus further comprises at least one agent for reducing at least one atmospheric oxidising pollutant. The or each reducing agent can be supported on the same or a different surface from the trap material. For example, the at least one agent can be in a separate layer under the trap material. However, we prefer that the at least one reducing agent is supported on a surface within the apparatus separate from the surface supporting the trap material. In any event, the arrangement must be such that the at least one reducing agent is contacted by gas leaving the trap material. In a particularly preferred arrangement, the apparatus is mounted in the engine compartment of a vehicle and comprises an upstream condenser or radiator supporting the trap material and a downstream radiator or condenser supporting the at least one reducing agent.

The at least one reducing agent can be any agent that is capable of reducing atmospheric oxidising pollutants. In particular the at least one reducing agent can be any catalyst described in WO 96/22146 for this purpose, such as a manganese-based reducing agent, e.g. $MnO_2$ or cryptomelane. Moreover, it can include one or more precious metals, such as platinum group metals. However, we presently prefer to use one or more reducing agents described in our application entitled "Agents for reducing atmospheric oxidising pollutants" with the same filing date as the present application. Suitable reducing agents include at least one transition element and/or one or more compounds including at least one transition element wherein the standard electrode potential of the redox reaction including the transition element and an ionic species of the transition element or between the ionic species of the transition element present in the or each compound and a further ionic species of the transition element is less than +1.0 volt.

Preferably, the transition element is copper, iron or zinc or a mixture of any two or more thereof. The or each compound including one or more transition element can be any suitable compound such as an oxide, carbonate, nitrate or hydroxide, but is preferably an oxide. In some circumstances, it is preferable to reduce the transition element in a transition element-including compound if in the reduced form the reducing agent is more active in its intended use. Compounds including transition elements prior to reduction can be referred to as 'precursor'. For example, in a preferred embodiment the reducing agent is $CuO/ZnO//Al_2O_3$ is the precursor and the active form of the reducing agent is obtained by reducing the CuO to give $Cu/ZnO//Al_2O_3$. The reduced form of a transition element can be stabilised with suitable stabilisers as appropriate.

If supported, the transition element or transition element compound is preferably supported on a high sure area oxide selected from alumina, ceria, silica, titania, zirconia, a mixture or a mixed oxide of any two or more thereof.

According to preferred embodiments, the active form of the reducing agent is copper (II) oxide per se, a mixture of reduced copper (II) oxide and zinc oxide on an alumina support or iron oxide on a mixed alumina/ceria support.

Methods of manufacturing copper (II) oxide, copper (II) oxide and zinc oxide on $Al_2O_3$ or iron oxide on a mixed alumina/ceria support are known to a person skilled in the art or can be deduced by reasonable experimentation, e.g. by co-precipitation of the or each transition element component and/or support. For example, in a $CuO/ZnO//Al_2O_3$ reducing agent the Cu and Zn can be co-precipitated and the already formed $Al_2O_3$ added thereto. Specific details of the manufacturing processes will not be given here.

The $CuO/ZnO//Al_2O_3$ reducing agent composition can be any suitable for the intended e.g. CuO30:ZnO60:$Al_2O_3$ 10 or CuO60:ZnO30:Al$_2$O$_3$ 10. Commercially available forms of these compositions are available from ICI as ICI 52-1 and ICI 51-2 respectively. Commercially available CuO/ZnO//Al$_2$O$_3$ is sold as pellets, which can be ground to the required particle size.

The trap material and, where present, the or each reducing agent can be applied to the support surface in a formulation including suitable binders, stabilisers, age resistors, dispersants, water resistance agents, adhesive improvement agents etc. known to persons skilled in the art. Binders include polymeric binders which can be thermosetting or thermoplastic polymeric binders and are listed in WO 96/22146, incorporated herein by reference. However, we most prefer to use water soluble binders, particularly organic binders including vinyl and acrylic water soluble binders e.g. PVA, cellulosic binders including ether or ester or semi-synthetic cellulosic binders, preferably hydroxypropyl- or methyl cellulose or mixtures of any two or more of the above mentioned binders, e.g. a mixture of PVA and hydroxypropyl cellulose. The preferred binders are described in our co-pending application entitled "Compositions including agents for reducing atmospheric oxidising pollutants" filed on the same date as the present application.

An important advantage of the compositions including the preferred binders is that the compositions can be cured at relatively low temperatures, e.g. ≦90° C., compared with compositions including Engelhard's preferred binders. In particular, this feature enables the preparation of a radiator core fitted with its plastic tanks in a continuous process; i.e. without having first to prepare a coated core and then fit the plastic tanks thereto. However, with compositions requiring higher curing temperatures, the coated radiator core must be prepared before assembling the tanks to prevent heat damage to the tanks during curing. Thus, not only is there an economic advantage in that the energy required to cure the composition is reduced, but the process of radiator manufacture is simplified.

Figure 1B:
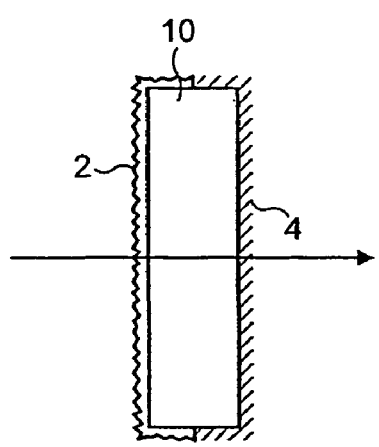
Figure 1C:
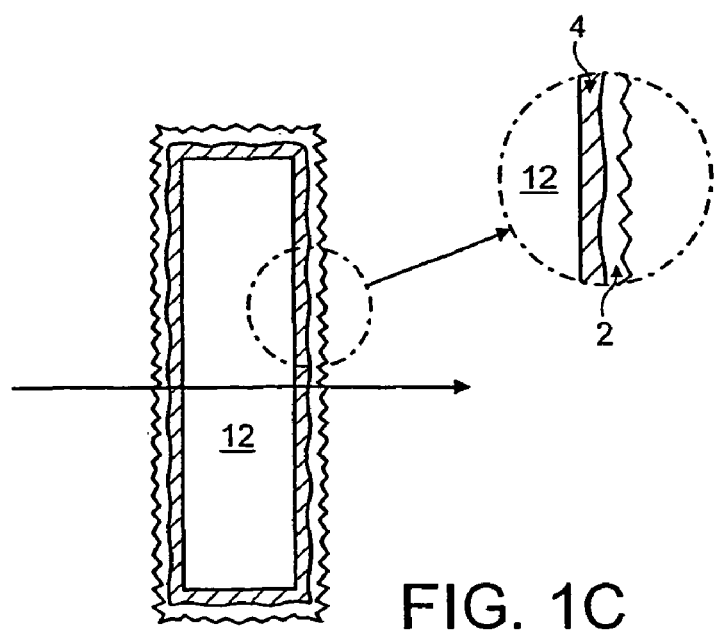
Figure 2:
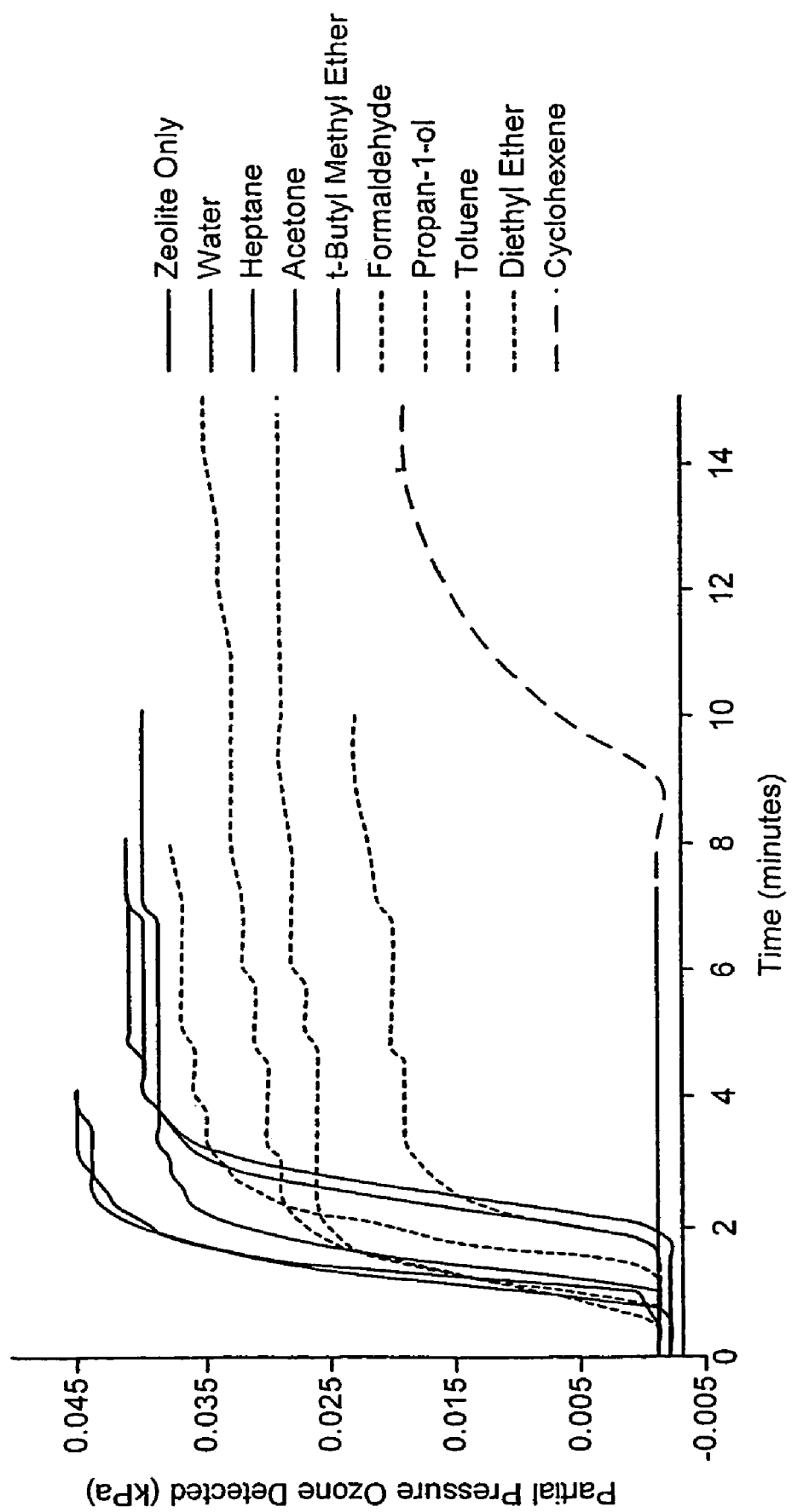

In order that the invention may be more fully understood, the invention will now be described by reference to the following illustrative Examples and by reference to the accompanying drawings, in which:

FIG. 1 is a schematic-drawing showing three arrangements according to a preferred embodiment of the apparatus according to the present invention; and FIG. 2 is a graph showing the amount of O$_3$ detected in the exhaust gas against time.

Referring to FIG. 1, 2 is a composition comprising beta-zeolite, and 4 is a composition including a mixture of "reduced" copper (II) oxide and zinc oxide on an Al$_2$O$_3$ support (Cu/ZnO//Al$_2$O$_3$) for reducing at least one atmospheric oxidising pollutant, such as O$_3$. In FIG. 1A, composition 2 is supported on an aluminium alloy air conditioning condenser 6 and composition 4 is supported on an aluminium alloy radiator 8. Both the condenser 6 and the radiator 8 are mounted in the engine compartment (not shown) of a motor vehicle in such a way that the condenser 6 is forward of the radiator 8. The arrangement is such that when the motor vehicle is travelling in its forward direction, substantially all the atmospheric air (represented by the arrow) entering the engine compartment that contacts the condenser 6 and the supported composition 2 thereon also passes over the downstream radiator 8 and the supported composition 4. In other words, atmospheric air contacts the zeolite first before the at least one reducing agent.

FIG. 1B shows an alternative arrangement of an aluminium alloy radiator 10 coated with composition 2 on its upstream half and with composition 4 on its downstream half. Once again, it will be seen that this configuration maintains the requirement for the atmospheric air first contacting the zeolite before the at least one reducing agent.

FIG. 1C shows a further embodiment wherein an aluminium alloy radiator 12 is coated with a first layer of composition 4 over which composition 2 is coated. Here atmospheric air will contact the zeolite first before contacting the at least one reducing agent.

EXAMPLE 1

To test the concept of reducing O$_3$ using a HC trapped on a trap material, we investigated the reaction of O$_3$ with a selection of trapped HC at room temperature. A test rig comprising an upstream O$_3$ generator, a stainless steel tube including metal mesh to pack a reactor bed material therebetween and a downstream O$_3$ detector was set up in a fume cupboard O$_3$ was generated and mixed with air before passing through the reactor bed material comprising 1 inch (2.54 cm) of H-Y zeolite (Si:Al ratio 200:1) on which was adsorbed HC. The HC tested were an alkane (heptane), an alkene (cyclohexene), an alcohol (propan-1-ol), an aromatic HC (toluene), an aldehyde (formaldehyde), a ketone (acetone) and two ethers (diethyl ether and t-butyl methyl ether). The exhaust gas from the reactor bed was passed through an O$_3$ detector (measured in 5 ppm units) before being vented. An inlet O$_3$ concentration of ~200 ppm at a space velocity (GHSV) of ~1000/hr was used. Whilst higher space velocities would be observed at, e.g. the surface of a vehicle radiator in use, and atmospheric O$_3$ concentrations are present in the parts per billion range, the results were useful to compare directly the potential of each HC material tested to reduce O$_3$.

Referring to FIG. 2, when the reactor bed was packed with zeolite only or zeolite and adsorbed water, the O$_3$ quickly passed through the reactor bed and reached its maximum value, indicating that no O$_3$ decomposition had occurred.

For all of the HC tested, there was a delay before O$_3$ reached the detector compared to the zeolite only sample and the outlet O$_3$ concentrations were lower than the inlet O$_3$ concentrations throughout the duration of the tests. Accordingly, there is clear evidence that O$_3$ reacts with trapped HC at room temperature. The greatest O$_3$ removal was observed with cyclohexene, with significant removal also occurring with diethyl ether and toluene. This could offer an additional advantage; such species have a higher propensity to form O$_3$ in the atmosphere than saturated alkanes. See the table of MIR adjustment factors in the Table at Appendix 1 of "Californian Non-methane organic gases test procedures", The California Environmental Protection Agency Air Resource Board dated Aug. 5, 1999, incorporated herein by reference.

EXAMPLE 2

There is now described a composition including a beta zeolite trap component for application to an aluminium radiator substrate.

Beta zeolite was mixed with an aqueous solution of hydroxypropyl cellulose binder, Klucel™, to a concentration of 10% wt/wt. The coating was applied to each side of a Visteon aluminium radiator of 20 mm thickness using a compressed air spray gun and then cured at up to 90° C.

The invention claimed is:

1. An apparatus for treating atmospheric pollutants, which apparatus comprises a heat exchange device; a first composition including a precious metal-free trap material supported on an atmosphere contacting surface of the heat exchange device, the trap material being capable of trapping at least one atmospheric reducing pollutant; a second composition including at least one second reducing agent for reducing at least one atmospheric oxidizing pollutant, which at least one second reducing agent comprises a manganese-based reducing agent, one or more precious metals, copper, iron, zinc or a mixture of any two or more of copper, iron and zinc and is supported on:
   (i) the same atmosphere contacting surface as the first composition or
   (ii) a different atmosphere contacting surface of the heat exchange device from the trap material; and
arranged such that the at least one second reducing agent is contacted by the atmospheric pollutants leaving the trap material; and means for causing movement of the heat exchange device relative to the atmosphere for contacting the supported trap material with at least one atmospheric oxidizing pollutant and at least one atmospheric reducing pollutant, whereby the at least one atmospheric oxidizing pollutant is reduced by a combination of the trap material and at least one trapped atmospheric reducing pollutant, which is consequently oxidized.

2. An apparatus according to claim 1, wherein the trap material is selected from the group consisting of a zeolite, a layered clay, an aluminum phosphates, a crystalline silicate, a crystalline silicate-containing species, alumina, silica, aluminosilicate and mixtures of any two or more thereof.

3. An apparatus according to claim 1, wherein where the at least one second reducing agent is supported on the same atmosphere contacting surface as the trap material, the at least one second reducing agent is layered under the trap material.

4. An apparatus according to claim 1, wherein the at least one second reducing agent is supported on a support selected from the group consisting of alumina, ceria, zirconia, titania, silica and mixtures thereof.

5. An apparatus according to claim 1, wherein the at least one second reducing agent comprises a mixture of copper (II) oxide and zinc oxide supported on alumina.

6. An apparatus according to claim 1, wherein the at least one second reducing agent comprises a compound comprising copper, iron, zinc or a mixture of any two or more of copper, iron and zinc, and wherein one or more of the copper, iron and zinc in the compound is in the reduced form.

7. An apparatus according to claim 6, wherein the at least one second reducing agent is $Cu/ZnO/Al_2O_3$.

8. An apparatus according to claim 1, wherein the means for causing movement of the surface relative to the atmosphere comprises a power plant.

9. An apparatus according to claim 8, wherein the power plant is an engine fuelled by a fuel selected from the group consisting of gasoline, diesel, liquid petroleum gas, natural gas, methanol, ethanol, methane and mixtures of any two or more thereof.

10. An apparatus according to claim 8, wherein the power plant is selected from the group consisting of an electric cell, a solar cell or a hydrocarbon or hydrogen-powered fuel cell.

11. An apparatus according to claim 1, wherein the heat exchange device is a radiator or an air conditioning condenser.

12. An apparatus according to claim 1, wherein the first composition, the second composition or the first and second compositions includes a thermosetting or thermoplastic polymeric binder or a mixture of any two or more thereof.

13. An apparatus according to claim 12, wherein the binder is a water-soluble binder.

14. An apparatus according to claim 13, wherein the water-soluble binder is a cellulosic binder.

15. An apparatus according to claim 14, wherein the cellulosic binder is an ether or ester or semi-synthetic cellulosic binder.

16. An apparatus according to claim 14, wherein the cellulosic binder is hydroxypropyl- or methylcellulose.

17. An apparatus according to claim 13, wherein the water-soluble binder is a vinyl or acrylic binder.

18. An apparatus according to claim 17, wherein the vinyl or acrylic binder is polyvinyl alcohol or ammonium polymethacrylate.

19. An apparatus according to claim 1, wherein the trap material is metal-substituted zeolite.

20. An apparatus according to claim 1, wherein the trap metal is a zeolite selected from the group consisting of beta-zeolite, zeolite Y and ZSM-5.

21. An apparatus according to claim 1, wherein the first composition, the second composition or the first and second compositions include a latex binder.

22. A vehicle including an apparatus according to claim 1.

23. A vehicle according to claim 22, wherein the apparatus comprises a radiator housed in an engine compartment thereof.

24. A vehicle according to claim 22, wherein the vehicle is a heavy-duty diesel vehicle.

* * * * *